US008169425B2

(12) United States Patent
Huang

(10) Patent No.: US 8,169,425 B2
(45) Date of Patent: May 1, 2012

(54) SOURCE DRIVER ADAPTED TO A DISPLAY PANEL

(75) Inventor: Da-Rong Huang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 684 days.

(21) Appl. No.: 12/353,673

(22) Filed: Jan. 14, 2009

(65) Prior Publication Data

US 2010/0177066 A1 Jul. 15, 2010

(51) Int. Cl.
*G06F 3/038* (2006.01)

(52) U.S. Cl. ........................................................ 345/204

(58) Field of Classification Search ........................ None
See application file for complete search history.

(56) References Cited

U.S. PATENT DOCUMENTS

| | | | | |
|---|---|---|---|---|
| 7,522,148 | B2 * | 4/2009 | Maki | 345/100 |
| 7,864,171 | B2 * | 1/2011 | Oomori et al. | 345/212 |
| 2005/0052395 | A1 * | 3/2005 | Choi et al. | 345/98 |
| 2006/0244710 | A1 * | 11/2006 | Iriguchi et al. | 345/100 |
| 2007/0001978 | A1 * | 1/2007 | Cho | 345/98 |
| 2008/0111628 | A1 * | 5/2008 | Tsuchi | 330/282 |

* cited by examiner

*Primary Examiner* — Richard Hjerpe
*Assistant Examiner* — Jeffrey A Parker
(74) *Attorney, Agent, or Firm* — J.C. Patents

(57) ABSTRACT

A source driver and a driving method thereof are provided. The source driver is adapted to a display panel. The source driver includes an output buffer and a regulating unit. The output buffer has an input terminal and an output terminal. The input terminal of the output buffer receives a pixel signal. The output terminal of the output buffer is coupled to the display panel for outputting an output signal. The regulating unit is coupled to the output terminal of the output buffer, for providing a charging current or a discharging current to the output terminal of the output buffer according to a polarity of the pixel signal. Thereby, a slew rate of the output signal is increased.

8 Claims, 3 Drawing Sheets

SOURCE DRIVER ADAPTED TO A DISPLAY PANEL

BACKGROUND OF THE INVENTION

1. Field of the Invention

The present invention relates to a driving technique of a display, in particular, to a source driver and a driving method thereof.

2. Description of Related Art

In recent years, liquid crystal displays (LCDs) have become dominant in the market due to the advantages of low power consumption, zero radiation, and high space utilization. A source driver is a critical element in an LCD, which converts a digital signal into an analog signal for being used in displaying images, and transmits the analog signal to each pixel on a display panel.

Generally, an operational amplifier (OP) is disposed at an output stage of the source driver, thereby improving a driving capacity of the source driver. The OP has many specification parameters, such as a unity-gain frequency, phase margin, power consumption, common-mode rejection ratio, power-supply rejection ratio, input common mode range, slew rate, and noise. The slew rate refers to a change rate of an output voltage, which is generally defined as volt/second (or microsecond).

It should be noted that, the slew rate may affect an image quality of the LCD directly. The higher the slew rate is, the shorter the time required for the source driver to provide correct analog signals to a display panel will be. On the contrary, the lower the slew rate is, the longer the time required for the source driver to provide correct analog signals to the display panel will be. As a result, the lower slew rate may lead to blurring or flickering of images.

SUMMARY OF THE INVENTION

Accordingly, the present invention is directed to a source driver, which is adapted to improve the quality of images displayed by a display panel.

The present invention is further directed to a driving method of a source driver, which is adapted to provide a charging current or a discharging current to an output terminal, so as to increase a slew rate of a pixel signal outputted by the source driver.

As embodied and broadly described herein, the present invention provides a source driver, adapted to a display panel. The source driver includes an output buffer and a regulating unit. The output buffer has an input terminal and an output terminal. The input terminal of the output buffer receives a pixel signal. The output terminal of the output buffer is coupled to the display panel for outputting an output signal. The regulating unit is coupled to the output terminal of the output buffer, for providing a charging current or a discharging current to the output terminal of the output buffer according to a polarity of the pixel signal. Thereby, a slew rate of the output signal is increased.

In the source driver according to an embodiment of the present invention, the regulating unit includes a multiplexer, a first source follower, a first switch, a second source follower, and a second switch. The multiplexer receives an indication signal and generates a first control signal and a second control signal according to the indication signal and a polarity of the pixel signal. A control terminal of the first source follower receives the pixel signal, and a first terminal of the first source follower is coupled to a first voltage. A first terminal of the first switch is coupled to a second terminal of the first source follower, and a second terminal of the first switch is coupled to the output terminal of the output buffer. The first switch is conducted according to the first control signal for providing the charging current to the display panel through the first source follower. A control terminal of the second source follower receives the pixel signal and a first terminal of the second source follower is coupled to a second voltage. A first terminal of the second switch is coupled to a second terminal of the second source follower, and a second terminal of the second switch is coupled to the output terminal of the output buffer. The second switch is conducted according to the second control signal for providing the charging current to the display panel.

In the source driver according to an embodiment of the present invention, a current amount of the first source follower and the second source follower is controlled by the pixel signal.

In the source driver according to an embodiment of the present invention, the output buffer includes an operational amplifier. A first input terminal of the operational amplifier serves as the input terminal of the output buffer, and a first output terminal of the operational amplifier is coupled to a second input terminal of the operational amplifier, and serves as the output terminal of the output buffer.

Furthermore, the present invention further provides a driving method of a source driver. The source driver includes an output buffer, in which an input terminal of the output buffer receives a pixel signal, and an output terminal of the output buffer is coupled to a display panel for outputting an output signal. In the driving method, an indication signal is asserted according to a scan driving signal associated with a scan line. When the indication signal is asserted, a control signal is generated according to a polarity of the pixel signal. Then, a charging current or a discharging current is selectively provided to the output terminal of the output buffer according to the control signal for increasing a slew rate of the output signal.

In the driving method according to an embodiment of the present invention, when the scan driving signal is asserted, the indication signal is asserted, and when the scan driving signal is de-asserted, the indication signal is de-asserted.

In the driving method according to an embodiment of the present invention, when the scan driving signal is de-asserted, the indication signal is asserted, and before the scan driving signal is asserted, the indication signal is de-asserted.

In the driving method according to an embodiment of the present invention, when the polarity of the pixel signal is positive polarity, the charging current is provided to the output terminal of the output buffer. When the polarity of the pixel signal is negative polarity, the discharging current is provided to the output terminal of the output buffer. In another embodiment, the current amount of the charging current and the discharging current is controlled by the pixel signal.

In view of the above, the present invention provides the charging current or the discharging current to the output terminal of the output buffer according to the polarity of the pixel signal through the regulating unit. Thereby, the slew rate of the pixel signal outputted by the output buffer is increased.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
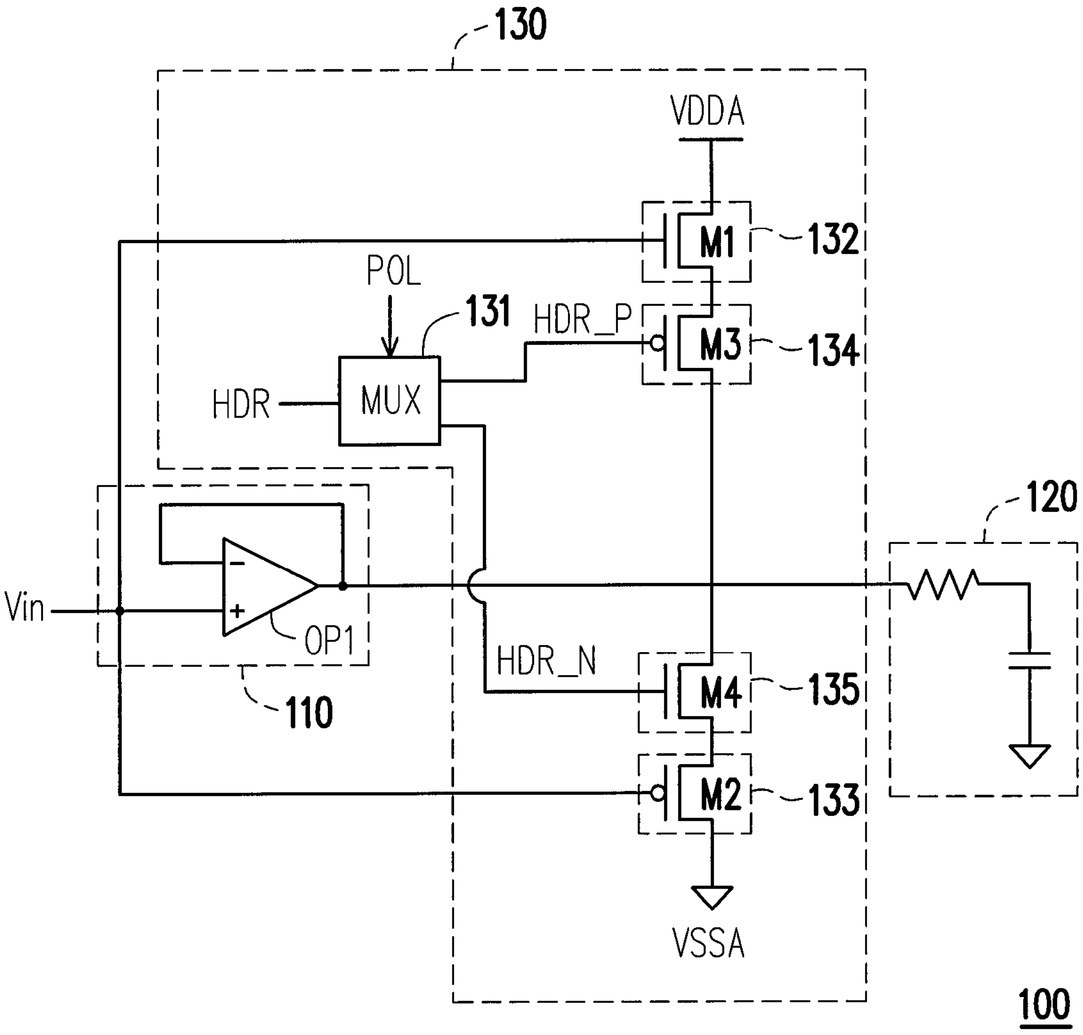
FIG. 1 is a circuit diagram of a source driver according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

In the prior art, if a slew rate of a pixel signal is too low, it may result in blurring or flickering of images displayed by the display panel. In view of the above problem, a regulating unit is disposed in a source driver according to the embodiments of the present invention. When a polarity of the pixel signal is reversed, the regulating unit provides a charging current or a discharging current to an output terminal of an output buffer according to the polarity of the pixel signal, thereby increasing the slew rate of the pixel signal outputted by the output buffer and improving the quality of images displayed by the display panel. Reference will be made below to the accompanying drawings to illustrate the embodiments of the invention in detail, examples of which are illustrated in the accompanying drawings. The same numerals are used in the drawings to refer to the same or like parts.

FIG. 1 is a circuit diagram of a source driver according to an embodiment of the present invention. Referring to FIG. 1, a source driver 100 is adapted to drive a display panel 120, for example, a liquid display panel or a liquid crystal on silicon (LCoS) panel. The source driver 100 includes an output buffer 110 and a regulating unit 130. The output buffer 110 is coupled to the regulating unit 130 and the display panel 120. The display panel 120 is represented as an equivalent circuit formed by resistors and capacitors, in which the resistor has, for example, wire resistance or impedance of pixel switches, and the capacitor has, for example, storage capacitance or pixel capacitance. In the embodiment of the present invention, the output buffer 110, for example, is implemented as a negative-feedback operational amplifier OP1, wherein an input terminal of the output buffer 110 receives a pixel signal Vin, and an output terminal of the output buffer 110 provides an output signal Vout to the display panel 120 to drive the display panel 120.

The regulating unit 130 is coupled to the display panel 120, and includes a multiplexer 131, source followers 132-133, and switches 134-135, wherein the source followers 132-133 are respectively implemented by transistors M1 and M2, and the switches 134-135 are respectively implemented by transistors M3 and M4. The source followers 132-133 have advantages of high input impendence and low output impendence, which The source followers 132-133 can be used for performing impedance matching, and an output signal thereof is changed as an input signal thereof. A source follower 132 is coupled between a voltage VDDA and the switch 134 for providing a charging current under the control of the pixel signal. The switch 134 is coupled between the source follower 132 and the output terminal of the output buffer 110. When the switch 134 is conducted, the source follower 132 provides the charging current to the output terminal of the output buffer 110 through the conducted switch 134.

Likewise, a source follower 133 is coupled between a voltage VSSA and the switch 135 for providing a discharging current under the control of the pixel signal. The switch 135 is coupled between the source follower 133 and the output terminal of the output buffer 110. When the switch 135 is conducted, the source follower 133 provides the discharging current to the output terminal of the output buffer 110 through the conducted switch 135. The multiplexer 131 receives an indication signal HDR and a polarity signal POL, and generates control signals HDR_P and HDR_N according to the indication signal HDR and the polarity signal POL. The indication signal HDR is a signal for driving the regulating unit 130 to operate, and the polarity signal POL indicates the polarity of the pixel signal Vin. In this embodiment, the indication signal HDR is associated with a scan driving signal of a scan line.

Figure 2:
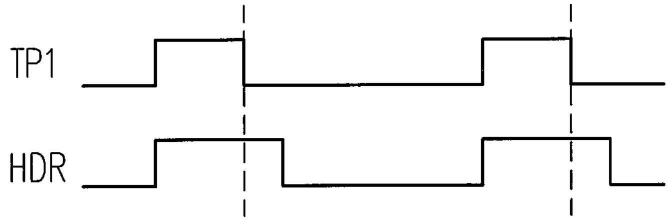
FIG. 2 is a timing diagram of an indication signal and a scan driving signal in the source driver of FIG. 1 according to the embodiment of the present invention.
Figure 3:
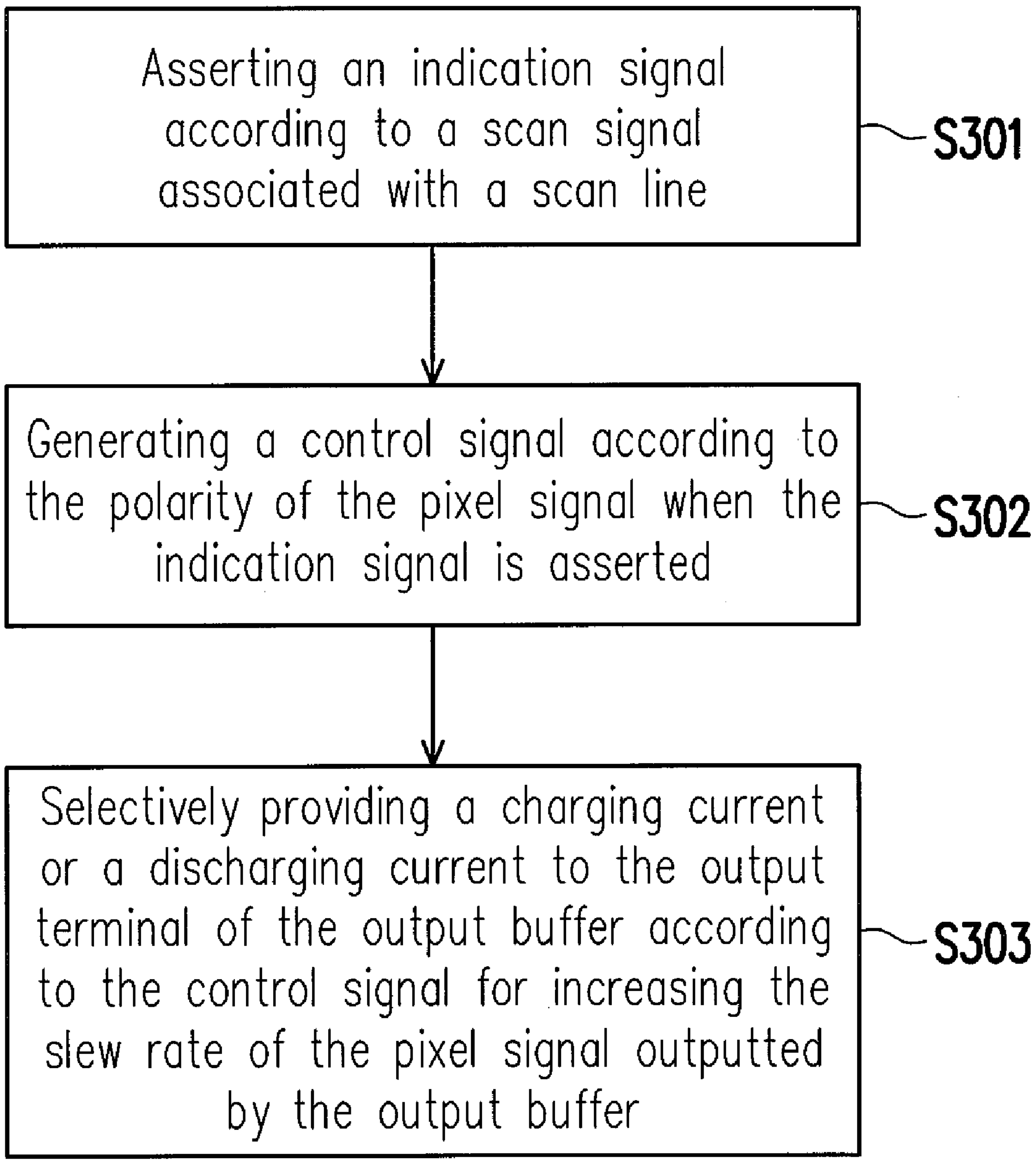
FIG. 3 is a flow chart of a driving method of a source driver according to an embodiment of the present invention.

The embodiment of the present invention is further described below with reference to the drawings. FIG. 2 is a timing diagram of an indication signal and a scan driving signal in the source driver of FIG. 1 according to the embodiment of the present invention. FIG. 3 is a flow chart of a driving method of a source driver according to an embodiment of the present invention. Referring to FIGS. 1, 2, and 3, when the scan driving signal TP1 is asserted, the source driver delivers the pixel signal Vin to pixels on the display panel through data lines. In order to increase the slew rate of the pixel signal outputted through the output buffer 110, when the scan driving signal TP1 is asserted, the indication signal HDR is asserted, so as to drive the regulating unit 130 to operate (Step S301).

In this case, the multiplexer 131 generates control signals HDR_P and HDR_N according to the polarity signal POL for indicating the polarity of the pixel signal (Step S302). In this embodiment, since the transistors M3 and M4 are respectively implemented by a P-type transistor and an N-type transistor, the control signals HDR_P and HDR_N are signals with same phase and used to control one of the switches 134 and 135 to be conducted. Persons of ordinary skill in the art can adopt other elements to implement the switches 134 and 135 and correspondingly design the control signals HDR_P and HDR_N for enabling one of the switches 134-135 to conduct according to the polarity of the pixel signal. Therefore, the regulating unit 130 selectively provides the charging current or the discharging current to the output terminal of the output buffer 110 according to the actuation of the control signals HDR_P and HDR_N (Step S303), so as to increase the slew rate of the pixel signal output by the output buffer 110.

For example, when the polarity signal POL indicates that the pixel signal Vin is reversed from a negative polarity to a positive polarity, the switch 134 is conducted under the control of the control signal HDR_P, and the switch 135 is not conducted under the control of the control signal HDR_N. At this time, the source follower 132 provides the charging current to the output terminal of the output buffer 110 through the conducted switch 134, which is helpful for increasing the voltage of the output signal Vout. On the other aspect, when the polarity signal POL indicates that the pixel signal Vin is reversed from a positive polarity to a negative polarity, the switch 134 is not conducted under the control of the control signal HDR_P, and the switch 135 is conducted under the control of the control signal HDR_N. At this time, the source follower 133 provides the discharging current to the output terminal of the output buffer 110 through the conducted switch 135, which is helpful for reducing the voltage of the output signal Vout. As such, the slew rate of the pixel signal outputted by the output buffer 110 can be increased effectively. In addition, referring to FIG. 2, after the scan driving signal TP1 is de-asserted, the indication signal HDR is de-asserted, so as to stop the operations of the regulating unit 130.

In the embodiment of FIG. 1, because the pixel signal with a positive polarity and the pixel signal with a negative polarity are usually at a high voltage and a low voltage respectively. In order to prevent the current provided by the source followers 132 and 133 implemented by transistors from being limited due to a body effect, the transistor M1 serving as the source follower 132 is an N-type transistor, and the transistor M2 serving as the source follower 133 is a P-type transistor.

It should be noted that, although a possible aspect of the source driver and the driving method thereof has already been described in above embodiments, persons of ordinary skill in the art shall know that the design of the source driver and the driving method thereof varies for different manufacturers, so the applications of the present invention are not limited to the above possible aspect. In other words, as long as the charging current or discharging current is provided to the output terminal of the output buffer according to the polarity of the pixel signal, it falls within the spirit of the present invention. Some specific embodiments are provided below for persons of ordinary skill in the art to further understand the spirit of the present invention, and to implement the present invention accordingly.

Figure 4:
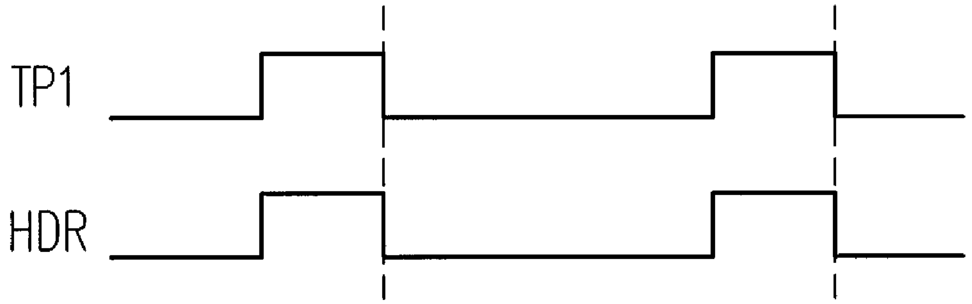
FIGS. 4 and 5 are timing diagrams of an indication signal and a scan driving signal in the source driver of FIG. 1 according to an embodiment of the present invention.
Figure 5:
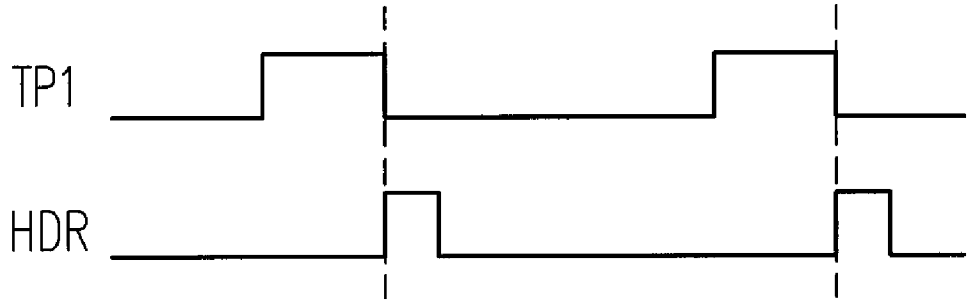

Although the above timing of the scan driving signal and the indication signal shown in FIG. 2 is taken as an example in the above embodiments to illustrate the operation of the regulating unit 130, but persons skilled in the art can change the timing of the scan driving signal and the indication signal depending upon the actual requirements, so that the present invention is not limited hereby. FIGS. 4 and 5 are timing diagrams of an indication signal and a scan driving signal in the source driver of FIG. 1 according to an embodiment of the present invention. Referring to FIG. 4, the difference between the timing shown in FIG. 4 and that shown in FIG. 2 is that the indication signal HDR is asserted and de-asserted with the timing of the scan driving signal.

Referring to FIG. 5, when the scan driving signal TP1 is de-asserted, the indication signal HDR is asserted to drive the regulating unit 130 to operate. At this time, the regulating unit 130 can regulate the slew rate of the pixel signal outputted by the output buffer 110 in advance. After a sufficient time for increasing the slew rate of the pixel signal outputted by the output buffer 110 (which can be controlled by a pulse width of the indication signal HDR) has elapsed, the indication signal HDR is de-asserted to stop the operations of the regulating unit 130 before the scan driving signal TP1 is asserted. However, when the scan driving signal TP1 is asserted, the pixel signal with the regulated slew rate outputted by the output buffer 110 is delivered to the pixels on the display panel.

In summary, the above embodiments provide the charging current or the discharging current to the output terminal of the output buffer according to the polarity of the pixel signal for increasing the slew rate of the pixel signal outputted by the output buffer. In addition, the provided charging current and discharging current can be regulated as the pixel signal changes, so as to properly increase or decrease the voltage at the output terminal of the output buffer according to the pixel signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A source driver, adapted to a display panel, comprising:

an output buffer, having an input terminal receiving a pixel signal, and an output terminal coupled the display panel for outputting an output signal; and a regulating unit, coupled to the output terminal of the output buffer for providing a charging current or a discharging current to the output terminal of the output buffer according to the polarity of the pixel signal, and thereby increasing a slew rate of the output signal, wherein the regulating unit comprises:

a multiplexer, receiving an indication signal, and thereby generating a first control signal and a second control signal according to the polarity of the pixel signal;

a first source follower, having a control terminal receiving the pixel signal, a first terminal coupled to a first voltage and a second terminal;

a first switch, having a first terminal coupled to the second terminal of the first source follower and a second terminal coupled to the output terminal of the output buffer, wherein the first switch is conducted according to the first control signal for providing the charging current to the display panel through the first source follower;

a second source follower, having a control terminal receiving the pixel signal, a first terminal coupled to a second voltage and a second terminal; and a second switch, having a first terminal coupled to the second terminal of the second source follower and a second terminal coupled to the output terminal of the output buffer, wherein the second switch is conducted according to the second control signal for providing the discharging current to the display panel through the second source follower.

2. The source driver as claimed in claim 1, wherein the first source follower comprises a transistor having a gate coupled to the input terminal of the output buffer, a first source/drain serving as the first terminal of the first source follower, and a second source/drain serving as the second terminal of the first source follower.

3. The source driver as claimed in claim 1, wherein the second source follower comprises a transistor having a gate coupled to the input terminal of the output buffer, a first source/drain serving as the first terminal of the second source follower, and a second source/drain serving as the second terminal of the second source follower.

4. The source driver as claimed in claim 1, wherein the first switch comprises a transistor having a gate receiving the first control signal, a first source/drain serving as the first terminal of the first switch and a second source/drain serving as the second terminal of the first switch.

5. The source driver as claimed in claim 1, wherein the second switch comprises a transistor having a gate receiving the second control signal, a first source/drain serving as the first terminal of the second switch and a second source/drain serving as the second terminal of the second switch.

6. The source driver as claimed in claim 1, wherein the output buffer comprises an operational amplifier having a first input terminal serving as the input terminal of the output buffer, a second input terminal, and a first output terminal coupled to the second input terminal for serving as the output terminal of the output buffer.

7. The source driver as claimed in claim 1, wherein the display panel is a liquid crystal on silicon panel.

8. The source driver as claimed in claim 1, wherein the display panel is a liquid crystal display panel.

* * * * *